April 22, 1958 K. J. KALLENBERG ET AL 2,831,979

X-RAY FILM-HANDLING DEVICE

Filed Feb. 21, 1952 9 Sheets-Sheet 1

INVENTOR.
KARL J. KALLENBERG
ROBERT SARDESON
BY Chas. C. Reif.
ATTORNEY

X-RAY FILM-HANDLING DEVICE

Filed Feb. 21, 1952 9 Sheets-Sheet 2

INVENTOR.
KARL J. KALLENBERG
ROBERT SARDESON
BY Chas. C. Reif
ATTORNEY

April 22, 1958 K. J. KALLENBERG ET AL 2,831,979

X-RAY FILM-HANDLING DEVICE

Filed Feb. 21, 1952 9 Sheets-Sheet 3

INVENTOR.
KARL J. KALLENBERG
ROBERT SARDESON
BY Chas. C. Reif
ATTORNEY

X-RAY FILM-HANDLING DEVICE

Filed Feb. 21, 1952

INVENTOR.
KARL J. KALLENBERG
ROBERT SARDESON
BY Chas. C. Reif
ATTORNEY

INVENTOR.
KARL J. KALLENBERG
ROBERT SARDESON
BY Chas. C. Reif
ATTORNEY

X-RAY FILM-HANDLING DEVICE

INVENTOR.
KARL J. KALLENBERG
ROBERT SARDESON
BY Chas. C. Reif
ATTORNEY

INVENTOR.
KARL J. KALLENBERG
ROBERT SARDESON
BY Chas. C. Reif
ATTORNEY

INVENTOR.
KARL J. KALLENBERG
ROBERT SARDESON
By Chas C. Reif
ATTORNEY

April 22, 1958 K. J. KALLENBERG ET AL 2,831,979

X-RAY FILM-HANDLING DEVICE

Filed Feb. 21, 1952 9 Sheets-Sheet 9

INVENTOR.
KARL J. KALLENBERG
ROBERT SARDESON
BY Chas. C. Reif
ATTORNEY

United States Patent Office 2,831,979

Patented Apr. 22, 1958

2,831,979

X-RAY FILM-HANDLING DEVICE

Karl J. Kallenberg and Robert Sardeson, Minneapolis, Minn., assignors to Pako Corporation, Minneapolis, Minn., a corporation of Delaware Application February 21, 1952, Serial No. 272,806

28 Claims. (Cl. 250—66)

This invention relates to a machine for taking X-ray pictures. While the machine is capable of having various applications, it is particularly designed to be used in hospitals. It is desirable in a modern hospital to have facilities for very quickly taking X-ray pictures of injured persons, including persons who have brain injuries, so that a diagnosis may be made as quickly as possible to determine if an operation would be desirable. In taking X-rays of the brain, a colored fluid is injected into an artery leading to the brain and this fluid diffuses through the smaller blood vessels of the brain so that quite a good picture can be obtained.

It is an object of this invention to provide an apparatus by means of which either a single or a series of X-ray film exposures can be very quickly made.

It is another object of the invention to provide such an apparatus as set forth in the preceding paragraph in which a strip of continuous film is used, said film having parts severed therefrom after each exposure. The severed exposed portions are moved by the machine into a container or receiver which can be removed at any time so that the exposed film can be carried to the processing laboratory.

It is also an object of the invention to provide an apparatus for taking X-ray pictures, which apparatus uses a continuous length of film, said apparatus having means for moving the film so that the exposed portion is moved out of the exposure position and a fresh portion of the film is simultaneously moved to exposure position.

It is still another object of the invention to provide an apparatus for taking X-ray pictures, which apparatus uses a continuous length of film. The apparatus has means for moving the film to move the exposed portion of the film out of exposure position and to simultaneously move a fresh portion of the film into exposure position, the movement of the said means being actuated after the exposure is completed, said means being controlled by the actuation of the X-ray apparatus. The apparatus thus does not control the beginning or the duration of the exposure but is responsive to the electrical circuit which actuates the X-ray unit so that movement of the apparatus to move the film occurs when the exposure has been completed. The machine thus imposes no limitations on either the frequency or the duration of the exposures other than that the capacity of the machine is approximately five movements of the film per second or five exposures per second.

It is another object of the invention to provide an apparatus for taking X-ray pictures using a continuous strip of film in which said film is moved after each exposure and the exposed portion is severed by a power-actuated shearing member.

It is a further object of the invention to provide an apparatus for taking X-ray pictures using a continuous length of film, which apparatus has means for clamping the film in position during exposure, then moving said film, again clamping said film and automatically severing the exposed portion of the film.

It is still another object of the invention to provide such an apparatus as set forth in the preceding paragraph, in which the movements of said film are caused by a means comprising a clutch and a brake, and which clutch and brake are preferably controlled by a single means.

It is also another object of the invention to provide an apparatus for taking X-ray pictures using a continuous length of film, said apparatus comprising means for severing an exposed portion of the film comprising a knife or shear which is swung to and from shearing position by a spring which is wound to a predetermined tension, said apparatus having means for restraining the motion of said knife or shear, and means for rendering said restraining means inoperative so that said spring will swing the knife or shear to and from shearing position.

It is still another object of the invention to provide an apparatus for taking X-ray pictures using a continuous length of film, which apparatus has one or more drive wheels for moving the film, said wheels having aperture-forming piercing members on their peripheries.

It is a further object of the invention to provide a machine for taking X-ray pictures using a continuous length of film, said apparatus having means for moving said film to move an exposed portion from exposure position and simultaneously moving a fresh portion into exposure position, and having means for cutting off the exposed portion of said film, said film-moving means being in advance of said last mentioned means.

It is also an object of the invention to provide such an apparatus as set forth in the preceding paragraph, said apparatus also having means for moving the film into a container, which latter means is beyond the means for cutting off the film and which moves the film at a slightly lower speed than the first mentioned film-moving means.

It is a further object of the invention to provide an apparatus for taking X-ray pictures using a continuous length of film, which apparatus has means for performing a sequence of operations, such as moving said film to move the exposed portion out of exposure position and to move a fresh portion into exposure position, clamping the film during exposure, unclamping the film to permit movement thereof, cutting off the exposed portion of the film, said means for performing said functions being so interlocked that the interference of a prior condition is always removed before the function is performed.

These and other objects and advantages of the invention will be fully set forth in the following description made in connection with the accompanying drawings in which like reference characters refere to similar parts throughout the several views and in which.

Figure 1:
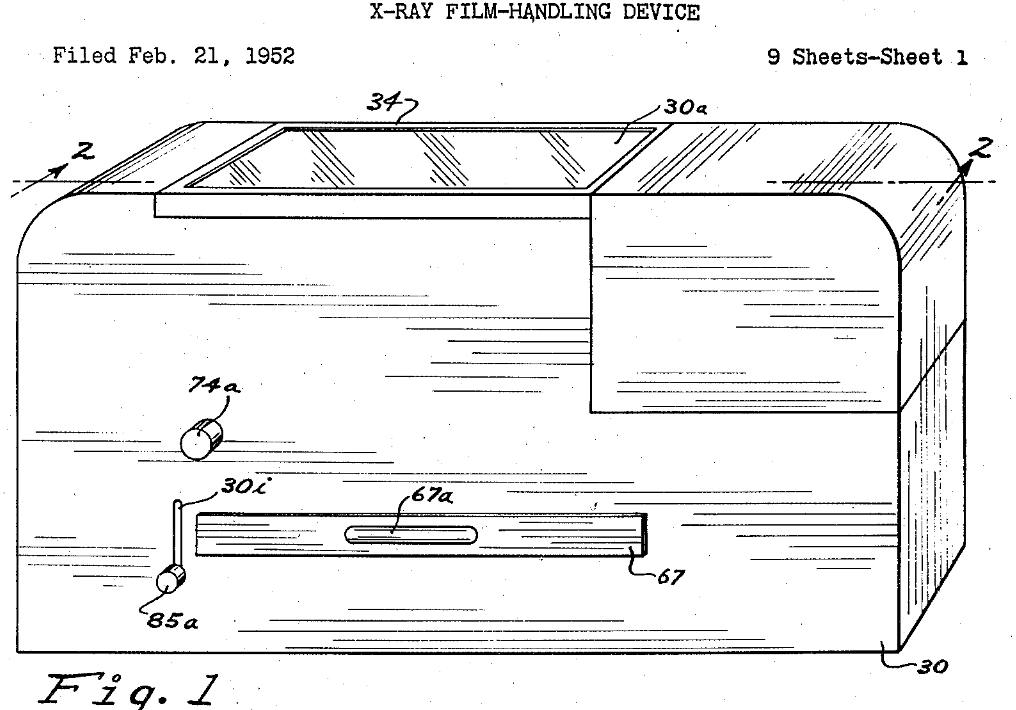
Fig. 1 is a perspective view of the apparatus as seen from the exterior and from one side thereof.
Figure 2:
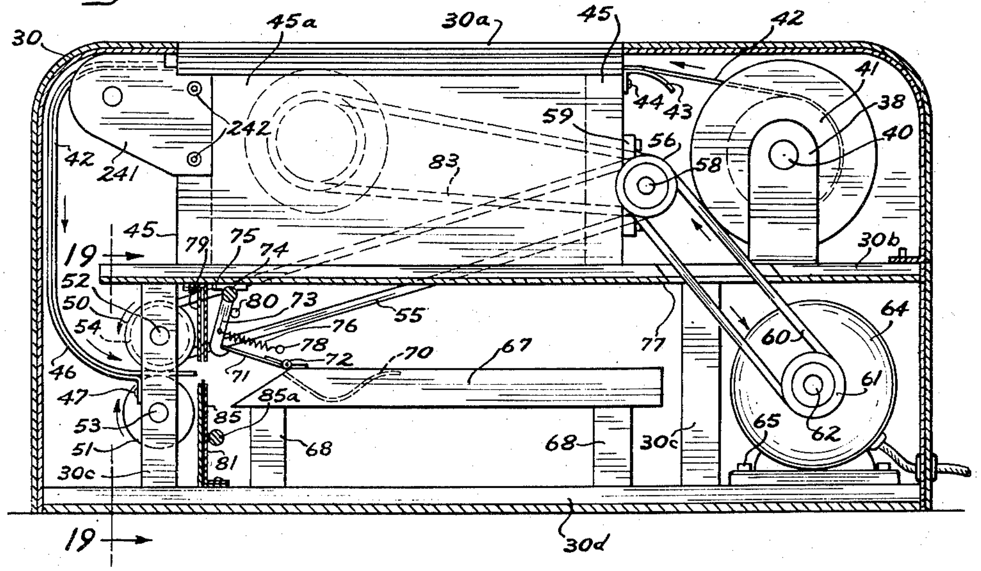
Fig. 2 is a vertical section taken substantially as indicated by line 2—2 of Fig. 4, as indicated by the arrows, and also through the casing.
Figure 7:
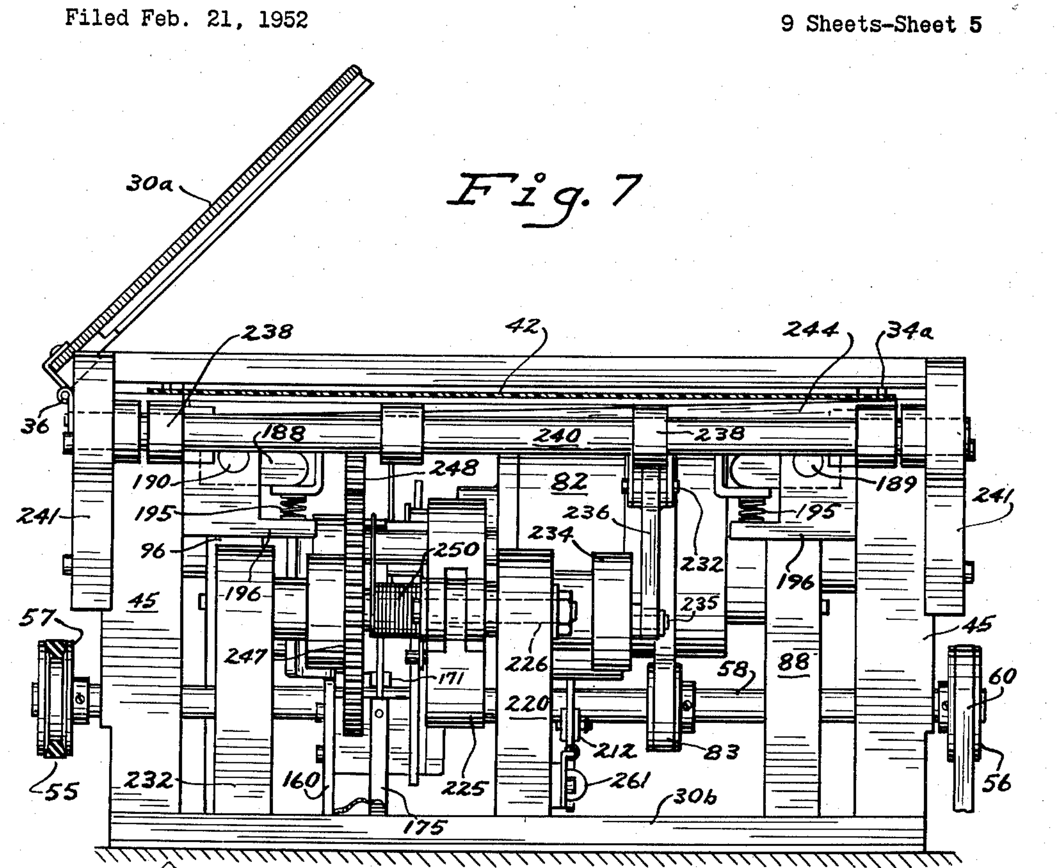
Fig. 7 is a view in end elevation of the apparatus in the casing showing a portion of the casing cover in lifted position, other parts of the casing being omitted.
Figure 8:
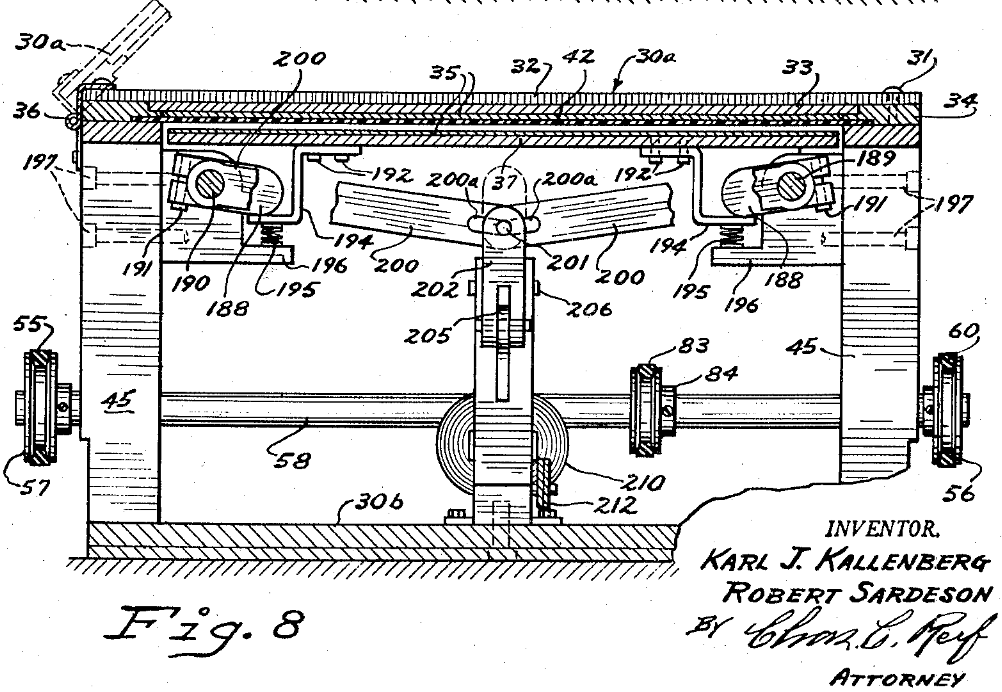
Fig. 8 is a transverse vertical section taken substantially on line 8—8 of Fig. 4, as indicated by the arrows.
Figures 11, 12, 13:
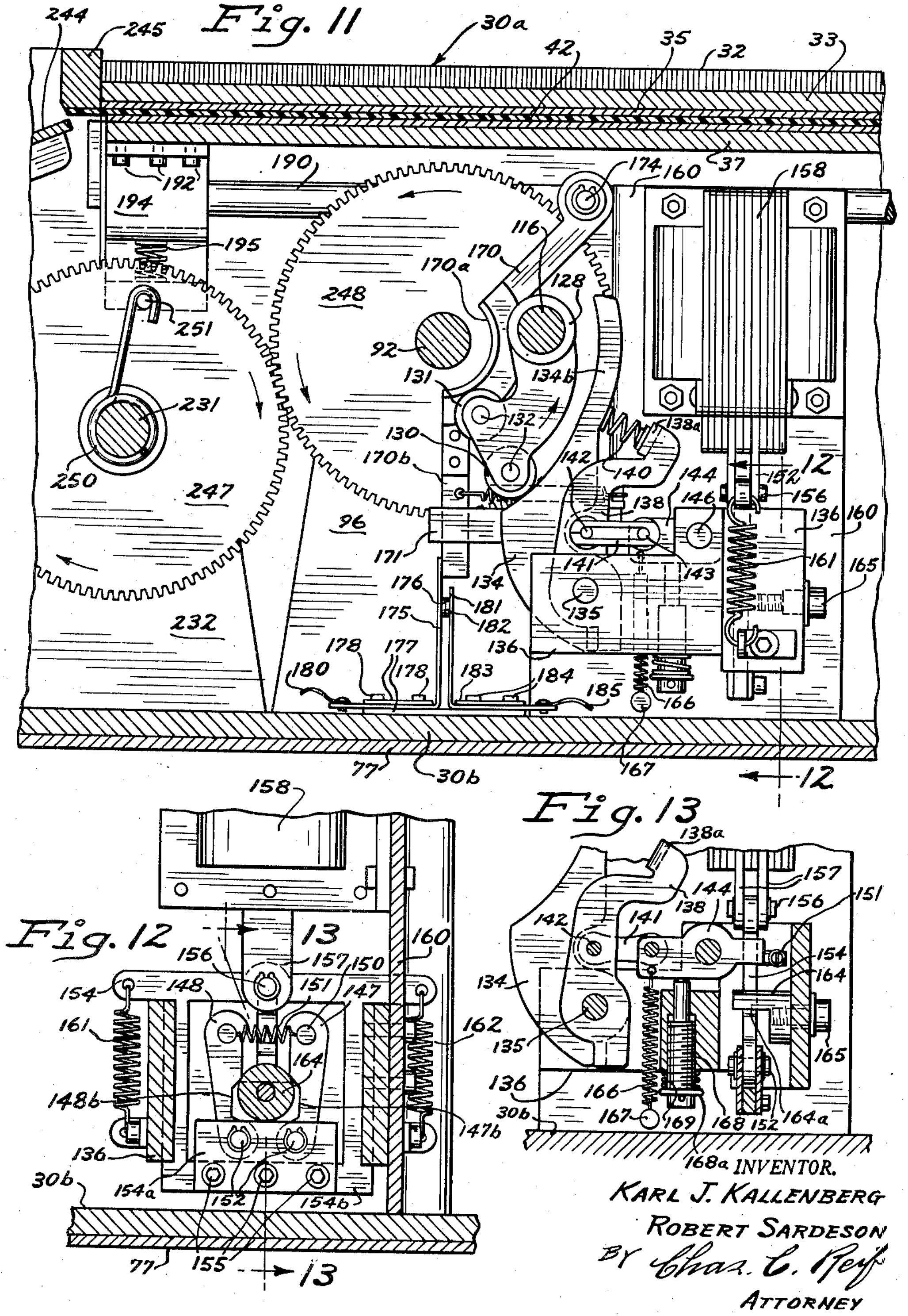
Fig. 11 is a vertical section taken substantially on line 11—11 of Fig. 4, as indicated by the arrows.
Fig. 12 is a partial vertical section taken substantially on line 12—12 of Fig. 11, as indicated by the arrows.
Fig. 13 is a partial vertical section taken on line 13—13 of Fig. 12, as indicated by the arrows.

Referring to the drawings, a device is shown comprising a casing 30. While this casing might take various forms, in the embodiment of the invention illustrated it is shown as of box-like form being rectangular in horizontal and vertical cross section, the same having a flat top and curved upper end corners. A portion **30*a*1 of casing 30, as shown in Fig. 1, is made separate and removable. As shown in Figs. 1, 2 and 11, said casing has an exposure portion 30*a* in its upper side. This portion comprises a rectangular frame 34, a top grid member 32 commonly used with X-ray apparatus, a plate 33 which may be of plastic material, a plurality of X-ray screens 35 which act to sharpen the image, and a metal plate 37. See Figs. 1, 2, 5, 6 ,7 8 and 11. Such members as the grid 32, the plate 33 and the screens 35 are well known in the X-ray art and specifically form no part of the present invention. Grid 32 is secured to frame portion 34 by screws 31, and plate 33 is supported in a rabbeted portion of frame 34. Top screen 35 is secured to plate 33. Frame 34 with grid 32, plate 33 and upper screen 35 are hinged at one side of the casing by a hinge 36** so that said frame may be lifted, as indicated in Figs. 7 and 8, for the purpose of loading or placing the film in the apparatus.

Casing 30 has a supporting plate **30*b* which is in turn supported by standards 30*c* extending to a bottom member 30*d*. Means is provided for carrying a supply of continuous film and while this may be variously located, in the embodiment of the invention illustrated it is shown as disposed in casing 30. A bracket 38 is secured to plate 30*b* and comprises side members in which is journaled a shaft 40 which carries a flange drum 41 on which is wound a continuous X-ray film 42. Film 42 extends from drum 41 over curved brackets 43 secured by screws 44 to supporting members 45 upstanding from plate 30*b*. Said film 42 passes between the screens 35, as seen in Fig. 11. Said film 42 then passes beyond the exposure portion 30*a* and along guide members 46 (see Fig. 2) secured to members 30*c* by the screws 47. Said film 42 is guided between a pair of rollers 50 and 51 carried on shafts 52 and 53 journaled in members 30*c*. Shaft 52 carries a pulley 54 over which runs a belt 55 also running over a pulley 57 secured to a shaft 58 carried in bearing brackets 59 secured to member 45. A belt 60 runs over pulley 56 and over a pulley 61 secured to the driving shaft 62 of an electric motor 64 disposed in one end of casing 30 and secured to bottom member 30*d* by bolts 65**.

Rollers 50 and 51 are arranged to grip the film 42 and to move the same. Said film is moved into a container 67 which is placed upon spaced supports 68. Said container has a flexible resilient member 70 therein beneath which a film or films are moved. Member 70 holds the films against the bottom of container 67. Said container 67 has a beveled end adapted to be closed by a swinging door 71 hinged to the top of said container by a hinge 72. Cover or door 71 is resiliently moved to closed position and the same is held open when container 67 is in casing 30 by a swinging latch 73 carried on a shaft 74 journaled in a small bracket 75 secured to a plate 77 extending over the top of members **30*c*, which plate is preferably made of lead to form a shield. Latch 73 which has a lip or ledge for holding the end of door 71 is moved into door-holding position by a tensile coiled spring 76 secured to latch member 73 and to a stationary pin 78. Shaft 74 extends to the outer side of casing 30, as shown at 74*a* in Fig. 1, and can be turned to operate latch member 73. Latch member 73 is moved against a pin 80 forming a stop for said latch when in holding position. Container 67 is movable through an opening in the side of casing 30, as shown in Fig. 1, and has a handle 67*a*** thereon by means of which it may be withdrawn.

A bracket 79 having spaced plate-like portions is secured to and depends from plate 77. A bracket 81 having spaced plate-like portions vertically aligned with the similar portions of bracket 79 is secured to portion **30*d*. A light shield 85 is movable between the spaced portions of bracket 81 and can be moved upward between the portions of bracket 79. Shield 85 has a handle 85*a* by means of which it can be moved. Handle 85*a* is disposed at one side of casing 30 and has a reduced portion movabl in a slot 30*i*. When container 67 is to be removed, shield 85** will be moved upwardly so that light will be cut off from the exposed portion of the film to the left of the shield, as seen in Fig. 2.

Figure 4:
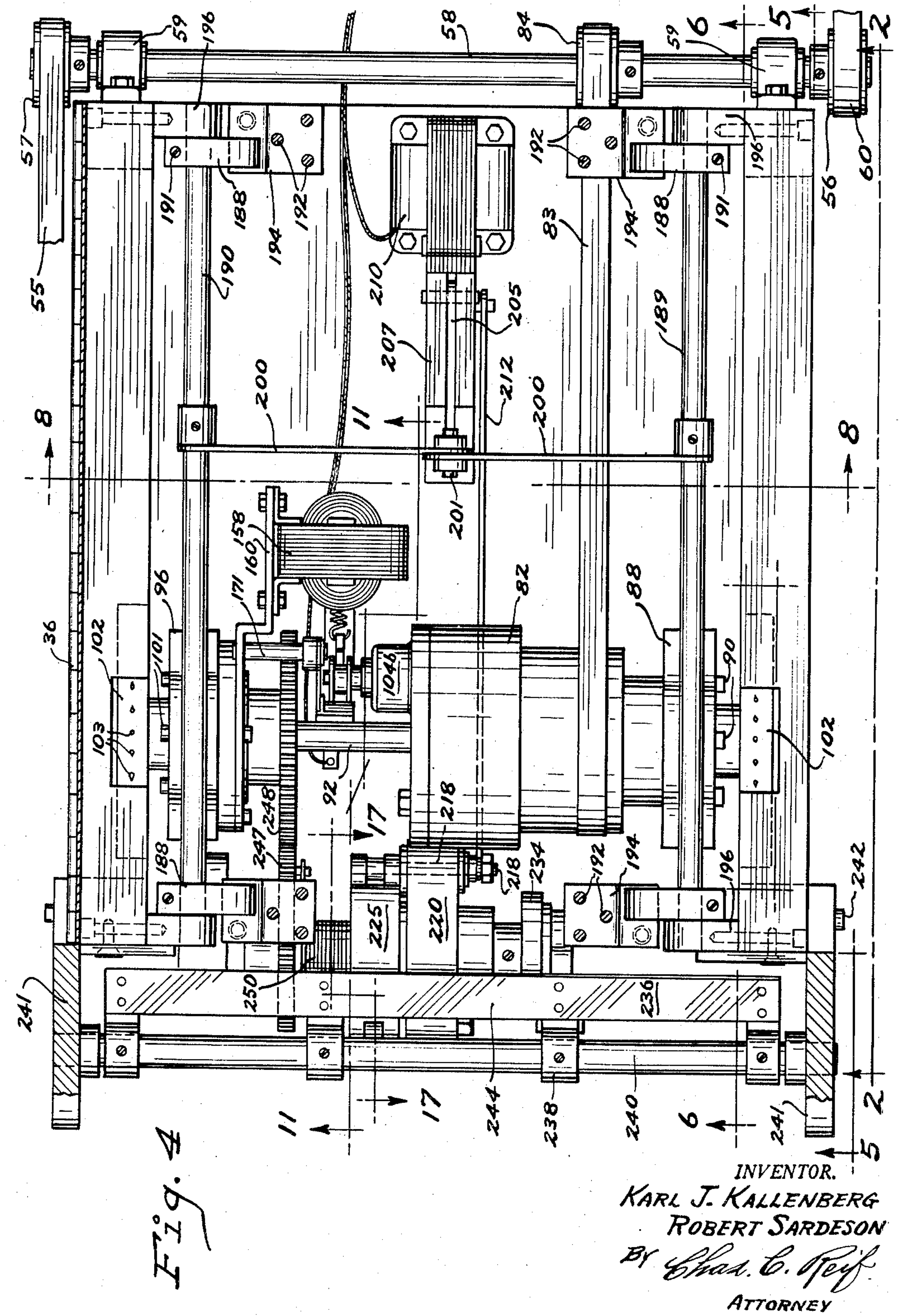
Fig. 4 is a horizontal section taken substantially on line 4—4 of Fig. 6, as indicated by the arrows.
Figures 5, 6:
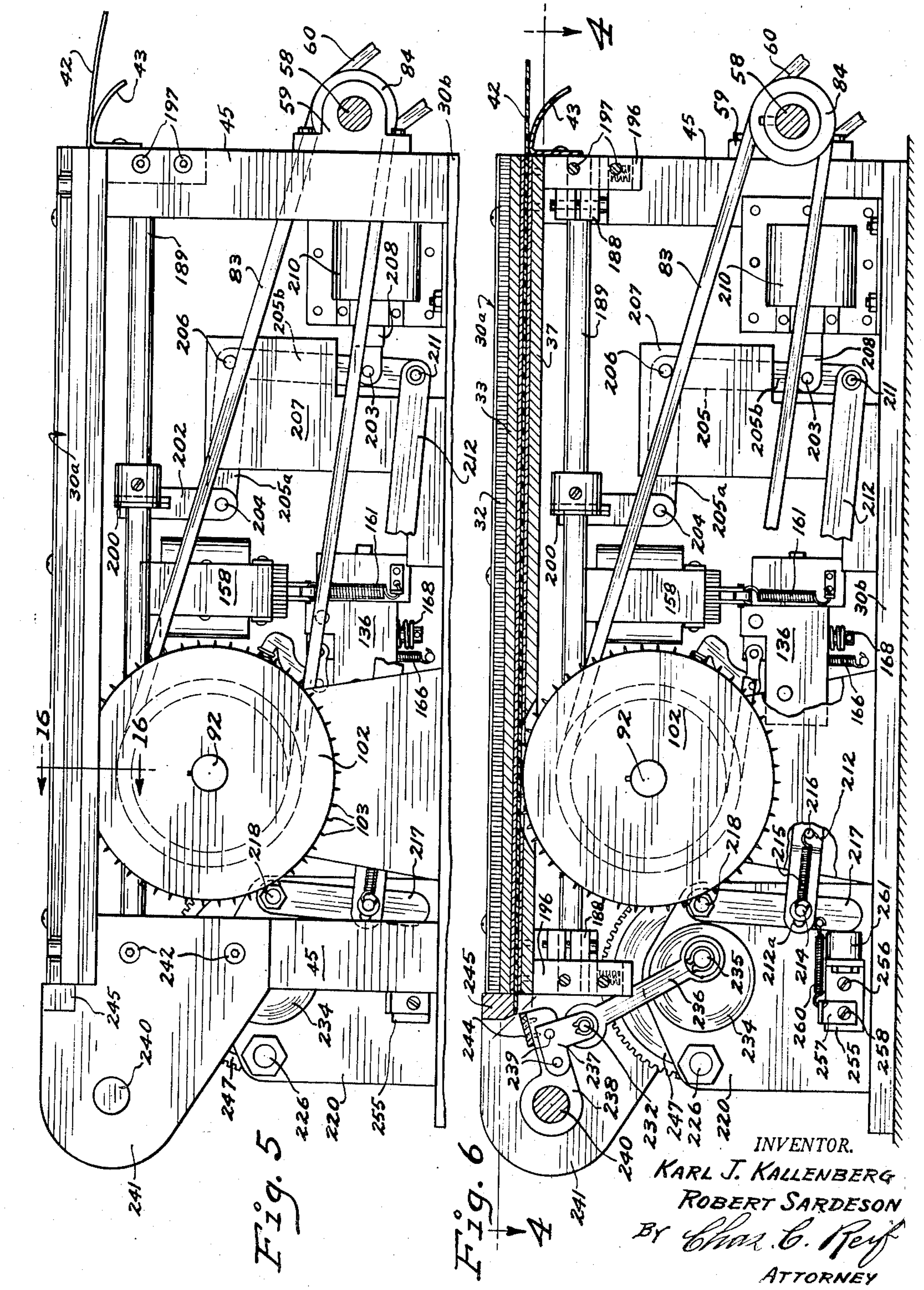
Fig. 5 is a vertical section taken substantially on line 5—5 of Fig. 4, as indicated by the arrows.
Fig. 6 is a vertical section taken substantially on line 6—6 of Fig. 4, as indicated by the arrows.
Figures 9, 10:
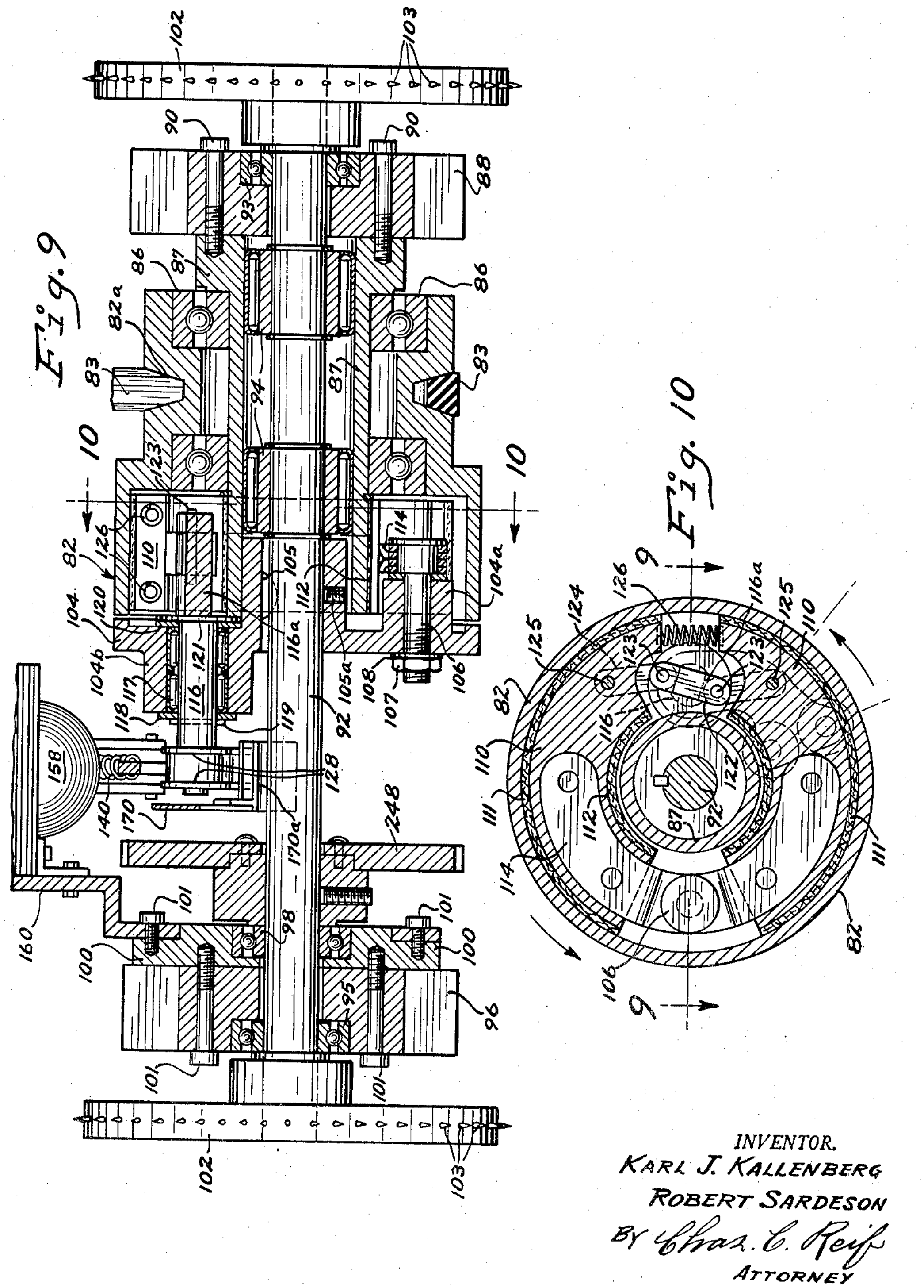
Fig. 9 is a horizontal section taken substantially on line 9—9 of Fig. 10, as indicated by the arrows.
Fig. 10 is a vertical section taken substantially on line 10—10 of Fig. 9, as indicated by the arrows.
Figures 14, 15, 16, 17:
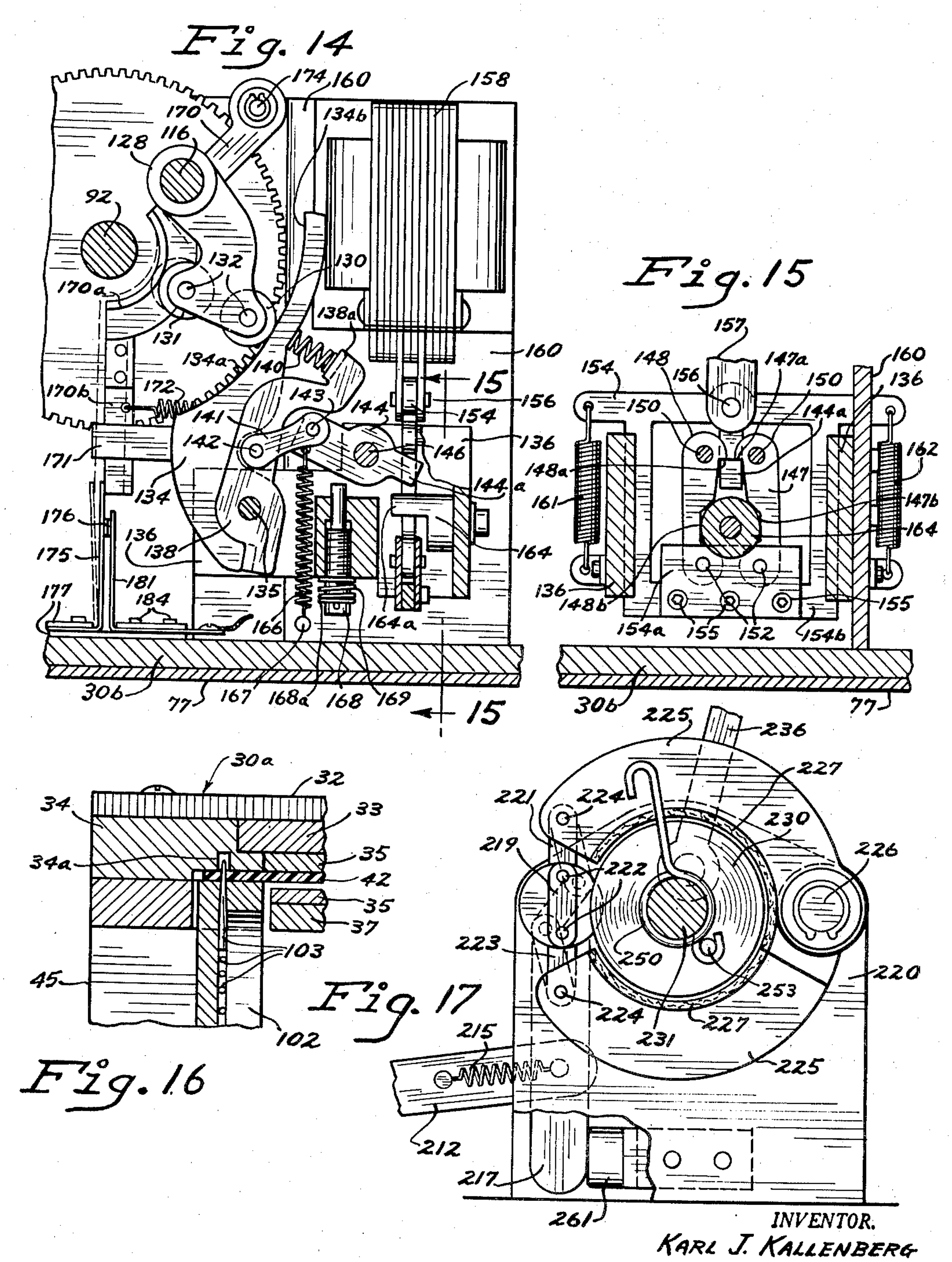
Fig. 14 is a partial vertical section similar to Fig. 11 showing the parts in a different position and with a portion of a supporting plate removed.
Fig. 15 is a partial vertical section taken subsantially on line 15—15 of Fig. 14, as indicated by the arrows.
Fig. 16 is a partial vertical section taken substantially on line 16—16 of Fig. 5, as indicated by the arrows.
Fig. 17 is a partial vertical section taken substantially on line 17—17 of Fig. 4, as indicated by the arrows.

A drum 82 is provided having a periphery with two portions, one of which is of smaller diameter, as shown in Figs. 4 and 9. Said portion of smaller diameter has therein a belt groove **82*a* in which a belt 83 is disposed, said belt passing over a pulley 84 secured to shaft 58. Drum 82 is supported upon ball bearing 86 supported upon a stationary cylindrical member or drum 87 having an end flange secured to a supporting bracket 88 by the headed bolts 90. A shaft 92 is journaled in ball bearings 93 carried in bracket 88 and is also journaled on needle bearings 94 supported in stationary member 87. Shaft 92 is also journaled in ball bearings 95 supported in a bracket 96. Brackets 88 and 96 are supported on member 30*b*. Shaft 92 is also journaled in ball bearing 98 carried in a plate 100 secured to bracket 96 by the headed bolts 101. Shaft 92 has secured to each end thereof wheels 102 which are provided on their peripheries with radially projecting pointed pins 103 which, as shown in Fig. 6, are adapted to engage and pierce the film 42 for moving said film. As shown in Fig. 16, frame member 34 is provided with a slot 34*a* adapted to receive the end portions of the pins or needles 103 after they have pierced the film 42. Shaft 92 is secured to a member 104 in any suitable manner, as by the key 105 and set screw 105*a*. Member 104 has a portion 104*a* extending into one end of drum 82. A stud 106 is secured in portion 104, the same having a threaded end on which is received a nut 107 engaging a washer 108 which in turn engages one side of member 104. Stud 106 forms the pivot for a pair of swinging members or shoes 110 disposed in a larger portion of drum 82. Members 110 have secured thereto layers of friction material 111 which extend about the outer sides thereof, as shown in Fig. 10. Members 110 also have secured to their inner concave sides layers of frictional material 112. Members 110 are carried on bifurcated members 114 which in turn are pivoted on stud 106. The frictional members 111 are adapted to engage the inner side of drum 82 while the friction members 112 are adapted to engage the periphery of the stationary member 87**. As shown in Fig.

9, shaft 92 extends through stationary member 87 and thus through drum 82.

Another member 116 is journaled in a projecting portion 104*b* of member 104 on needle bearings 117. Said bearings are engaged at their outer ends by a washer 118 held in place by a pin 119 extending through member 116. A washer 120 engages the inner end of bearings 117 and is held in place by annular portion 121 of a member 116*a* to be later described. Member 116 has a portion 116*a* projecting into drum 82. This portion is of substantially square shape in cross section and has lugs 122 projecting from either side thereof to which are secured by the pivot members 123 respectively, links 124, which links are pivoted at their other ends respectively to the shoes or members 110 by the pivot members 125. It will be seen from Fig. 10 that if member 116 is oscillated in one direction, the links 124 will force the shoes 110 and their friction portions 111 against the drum 82. If said member 116 is oscillated in the other direction, shoes 110 will be moved toward each other and their friction members 112 will engage stationary member 87. Actually members 110 are constantly urged away from each other to engage drum 82 by compression coiled springs 126 so that said shoes 110 and their friction portions are merely moved away from drum 82 by movement of member 116 and moved against member 87. Member 87 thus constitutes a brake which holds member 104 stationary and thus holds shaft 92 stationary. When the shoes 110 and their friction members 111 engage drum 82, said brake is released and shaft 92 is connected to the drum 82 through member 104 and said shaft is thus driven by drum 82. Drum 82 is constantly driven.

Figure 3:
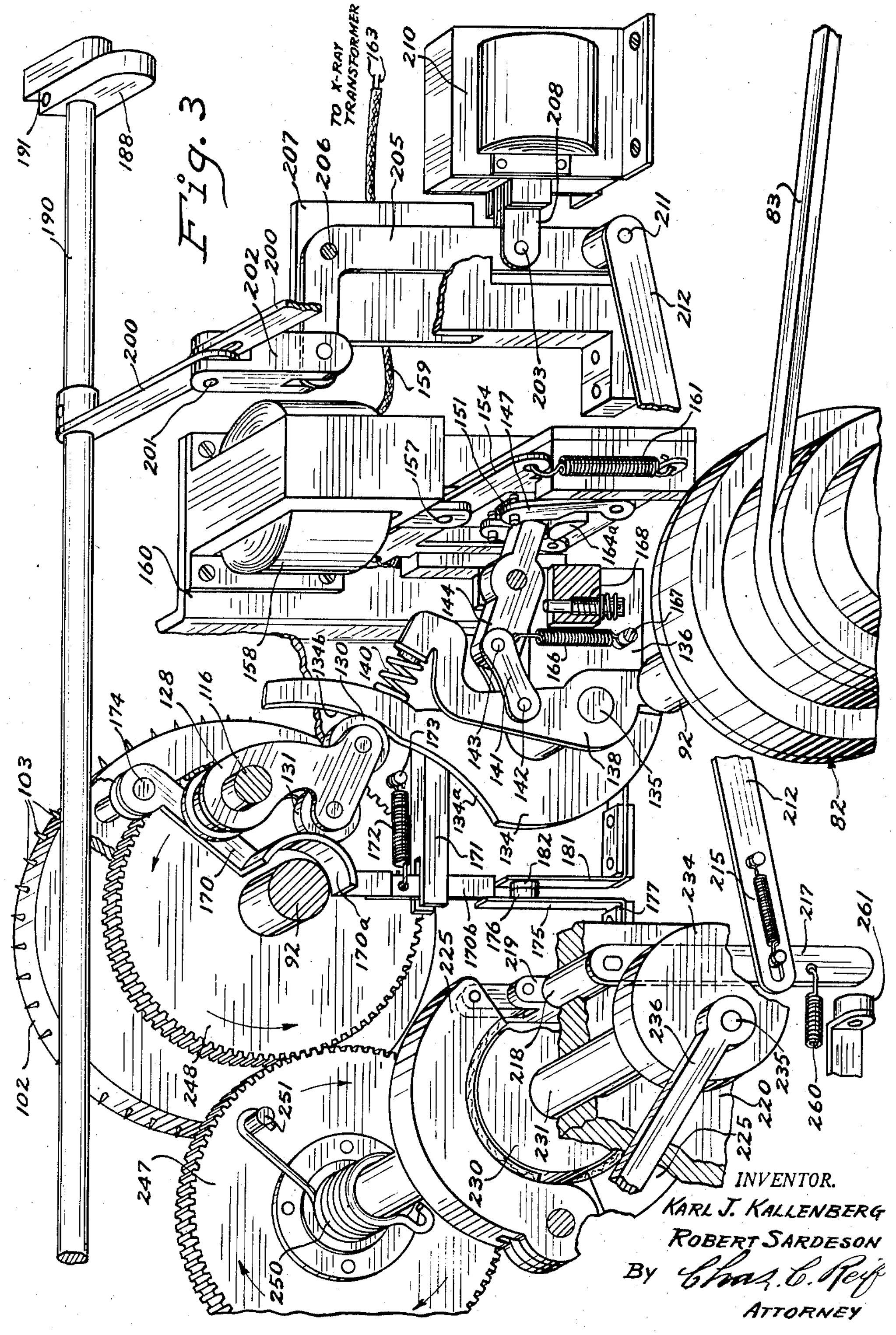
Fig. 3 is a perspective view showing a somewhat schematic arrangement of the various means for performing certain functions of the apparatus.

Member 116 projects away from member 104 and drum 82 and has secured thereto a member 128. Member 128 constitutes an arm having spaced plate-like portions between which are mounted a pair of rollers 130 and 131, as shown in Figs. 3, 11 and 14. These rollers are mounted upon studs 132 secured in member 128. Roller 130 is arranged to engage the cam surface 134*a* of a cam arm 134 which is mounted for swinging movement about a shaft 135 carried in a supporting plate 136*a* secured to a plate 136 in turn secured to member 160 which upstands from portion 30*b*. Member 134 has a second cam surface 134*b* adjacent the upper end of arm 134. A second arm 138 is swingable about shaft 135 and has a portion engaging the lower portion of arm 134. Arm 138 has an upper portion 138*a* which is spaced from the upper portion of arm 134 and a stiff compression coiled spring 140 is disposed between portion 138*a* and the upper portion of arm 134. Arm 138 and the spring 140 are provided so that when roller 130 engages cam surface 134*a* there will be some give or resiliency to arm 134 so as to relieve any shock. Arm 138 has pivotally connected thereto a link 141 by a pivot member 142. Link 141 is pivotally connected by a pivot 143 to a lever 144 which is swingable about a shaft 146 mounted in supporting plate 136. Lever 144 has an end portion 144*a* of rectangular shape in cross section and adapted to be engaged by a pair of pawls 147 and 148. Pawls 147 and 148 have lips 147*a* and 148*a* adapted to engage the top of portion 144*a*, as shown in Fig. 15. Said pawls have pins 150 at their upper ends which are connected by a tensile coiled spring 151 which tends to pull the upper ends of said pawls together. Pawls 147 and 148 are pivotally connected at their lower ends by pivot members 152 respectively to a plate 154*a* which is secured to a yoke 154. As clearly shown in Figs. 12 and 15, yoke 154 has a top portion or bar, spaced side portions and a lower portion or bar 154*b* to which plate 154*a* is connected by the bolts 155. Yoke 154 is connected at the center of its top portion by a stud 156 to a pair of bars 157 which are connected to the vertically movable core of a solenoid 158. Solenoid 158 is secured to a supporting plate 160 which upstands from member 30*b*. A cable 159 is shown as extending from the winding of solenoid 158 and carries a pair of conductors 163 which will extend to the transformer of the X-ray machine. When the X-ray machine is operating when making the exposure, the solenoid 158 will be energized. The top portion of yoke 154 projects at its opposite ends and said ends each have secured thereto respectively tensile coiled springs 161 and 162 which are connected at their lower ends to plates 160 and 136 respectively. A cam member 164 is secured to a portion of plate 136 by a headed stud 165. Member 164 has an end portion 164*a* of segmental form in cross section, as shown in Figs. 3, 12 and 13, and said portion is disposed between the pawls 147 and 148. Pawls 147 and 148 have recesses 147*b* and 148*b* in their adjacent sides with diverging top and bottom sides, and the top ones of said diverging sides of said recesses engage the curved top portion of cam portion 164*a* so that when said pawls are moved downwardly they will be separated by said cam portion against the tension of spring 151, as shown in Fig. 12. Lever 144 has secured to its end adjacent link 141 a tensile coiled spring 166, the lower end of which is secured to a pin 167 in turn secured to plate 136. A stop member 168 is threaded into a projecting portion of plate 136, the same having an upper reduced end adapted to be engaged by lever 144 when in the position shown in Fig. 13. Member 168 carries an enlarged portion 168*a* engaged by one end of a coiled compression spring 169, the other end of which engages the bottom of the projection into which member 168 is threaded.

It will be seen that link 141 and lever 144 form a toggle, which is shown in straightened position in Figs. 11 and 13, and is shown in broken position in Fig. 14. It will be seen that when solenoid 158 is energized it will pull upwardly on members 157, thus moving yoke 154 upwardly with pawls 147 and 148. When solenoid 158 is deenergized the springs 161 and 162 will move yoke 154 downwardly and pawls 147 and 148 will be in the position shown in Fig. 15 and will pull down on portion 144*a* of lever 144 and will break said toggle.

A member 170 is swingingly mounted on a stud 174 secured in plate 160. Member 170 is in the form of an arm and has a semicylindrical shell-like portion 170*a* thereon from which depends a bar-like portion 170*b*. Roller 131 carried on arm 128 engages the outer convex side of portion 170*a*. Portion 170*b* is disposed between the sides of a fork formed on the free end of a member 171 which extends substantially horizontally and is secured at its other end to plate 160. A tensile coiled spring 172 has one end secured to portion 170*b* and has its other end secured to a pin 173 secured in plate 160. Portion 170*b* adjacent its lower end is positioned to engage a resilient strip 175 carrying an electrical contact 176. Strip 175 is secured between insulating members 177 secured by screws 178 to portion 30*b*. A conductor 180 extends from the other end of strip 175. Another strip 181 carries an electrical contact 182 adapted to engage contact 176. Strip 181 is held between one insulating member 177 and another insulating member 183, which insulating members are secured to portion 30*b* by the screws 184. A conductor 185 is connected to the end of strip 181.

Means for clamping and holding the film stationary during exposure are provided. Plate 37 which is below the lower screen 35 has secured thereto by the screws 192, Z-shaped brackets 194. The lower arms of brackets 194 are engaged by compression coiled springs 195, the lower ends of which engage brackets 196 secured to the end frame members 45 by screws 197. Springs 195 thus urge plate 37 and screen 35 upwardly against the film 42. Means for releasing the film are provided and these comprise swinging arms 188, said arms having bores into which extend shafts 189 and 190 respectively. Arms 188 have split ends extending from said bores and are clamped to said shafts by the bolts 191. Shafts 189 and 190 have secured thereto arms 200 which extend toward each other and have slots 200*a* therein close to their adjacent ends into which extends a pin 201 secured to a vertically moving bar 202 which is connected at its lower end by a pivot member 204 to one arm 205*a* of a bell crank lever 205 pivoted by a pivot 206 to a plate 207 upstanding from member 30*b*. The other arm 205*b* of lever 205 extends downwardly and has secured thereto adjacent its lower end by a pivot member 203 a member 208 secured to the core of a solenoid 210 carried on member 30*b*. The lower end of arms 205*b* has secured thereto by a pivot member 211 a link 212 which has a slot 212*a* in its other end through which extends a pin 214. Pin 214 has connected thereto at each side of link 212 a tensile coiled spring 215, the other end of which is connected to a pin 216 secured in link 212. Pin 214 is also secured to an arm 217 secured to a shaft 218 which is journaled in a plate-like bracket 220 upstanding from member 30*b*. Shaft 218 has secured thereto an arm 219. Arm 219 has secured thereto adjacent its opposite ends by pivot members 22, links 221 and 223 respectively. Links 221 and 223 are respectively connected at their other ends by the pivots 224 to restraining shoes 225 pivoted on a shaft 226 carried in bracket 220. Shoes 225 have secured to their concave inner side layers of friction material 227. The friction members 227 are adapted to engage the periphery of a disk 230 carried on a shaft 231 which is journaled in bracket 220 and a similar bracket 232 upstanding from member 30*b* and spaced from bracket 220. With the described construction it will be seen that when solenoid 210 is energized, arm 205*b* of bell crank lever 205 will be swung in a counter-clockwise direction, as seen in Fig. 6. This will pull down on arm 205*a* and member 202 will swung arms 220 downwardly at their adjacent ends, thus swinging arms 188. Arms 188 will engage the bottom portions of the Z brackets 194 and will move these brackets together with plate 37 and lower screen 35 downwardly against the pressure of springs 195. This will release the film, as shown in Fig. 8. The coil of solenoid 210 has its ends connected to conductors 180 and 185 respectively so that when contacts 176 and 182 are connected said solenoid will be energized and the film will thus be unclamped. It will also be seen that when arm 205*b* is moved in a counter-clockwise direction that it will pull upon link 212 which will swing arm 217 and oscillate shaft 218. Shaft 218 will be oscillated so that it will swing arm 219 and pull upon links 221 and 223 to cause the friction members 227 to clamp disk 230. Said disk and shaft 231 will thus be held from movement.

Shaft 231 has secured to one end a crank disk 234 having secured thereto spaced from the axis of shaft 231 a crank pin 235. A link 236 is journaled on pin 235 and is pivotally connected at its other end to a pin 232 carried in brackets 237 secured to the sides of an arm 238 by screws 239. Arm 238 is secured to shaft 240 journaled in brackets 241 secured to plates 45 at each side of the casing by headed bolts 242. Brackets 241 are carried by the members 45. Arm 238 carries a knife or shear blade 244. Shear blade 244 is adapted to cooperate with a shear bar 245 extending between brackets 241. A gear 247 is mounted for free rotation on shaft 231 and meshes with a gear 248 secured to shaft 92. A coiled torsion spring 250 surrounds shaft 231 and has one end secured to a pin 251 secured in gear 247. The other end of spring 250 is secured to a pin 253 secured in disk 230 which as stated is secured to shaft 231. A bracket 255 is secured to bracket 220 by a screw 256. A small angle bracket 257 is secured to bracket 255 by a screw 258. A tensile coiled spring 260 is secured at one end to bracket 257 and at its other end to arm 217. A resilient stop member 261 is secured to bracket 255 and is engaged by the lower portion of arm 217.

Figure 18:
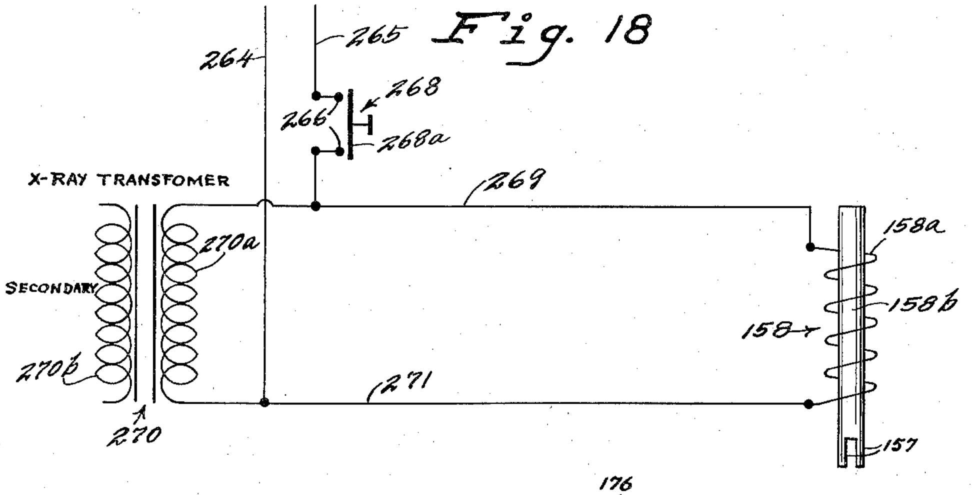
Fig. 18 is a wiring diagram of the electrical circuit including the transformer of the X-ray projector.

In Fig. 18 a wiring diagram is shown for the electrical circuit which includes the transformer of the X-ray projector and the solenoid 158. This diagram shows the service wires or conductors 264 and 265. Conductor 265 has therein a push-button switch having the fixed contacts 266 connected respectively to portions of conductor 256. A push-button 268 is shown having a contact 268*a* which will engage contacts 266 when button 268 is operated. Conductor 265 connects with a conductor 269 which is connected to one end of the primary coil 270*a* of a transformer 270. The secondary coil of said transformer is shown as 270*b*. The other end of coil 270*a* is connected to a conductor 271 to which conductor 264 is connected. Conductors 269 and 271 are connected respectively to the ends of the coil 158*a* of solenoid 158. The core of said solenoid 158*b* is also shown to which members 157 are connected.

When push-button 268 is operated, current will be supplied to the transformer 270 and thus to the X-ray projector. This energizes solenoid 158. When the exposure is finished, push-button 268 is released and the circuit to the transformer 270 and solenoid 158 is broken. Solenoid 158 is deenergized and this starts the cycle of the apparatus which will be later described.

Figure 20:
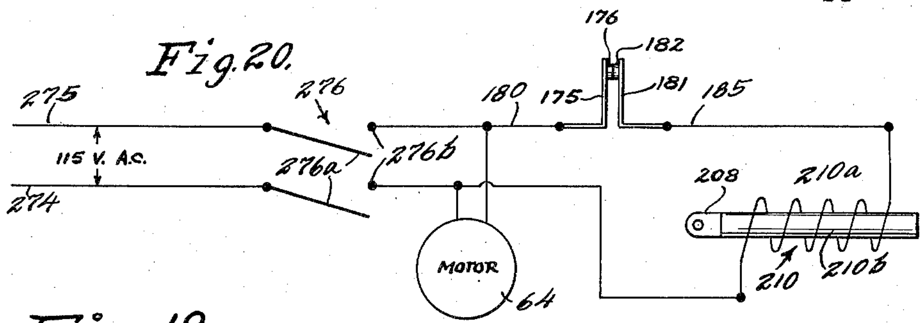
Fig. 20 is a wiring diagram of one of the electrical circuits used.
Figure 19:
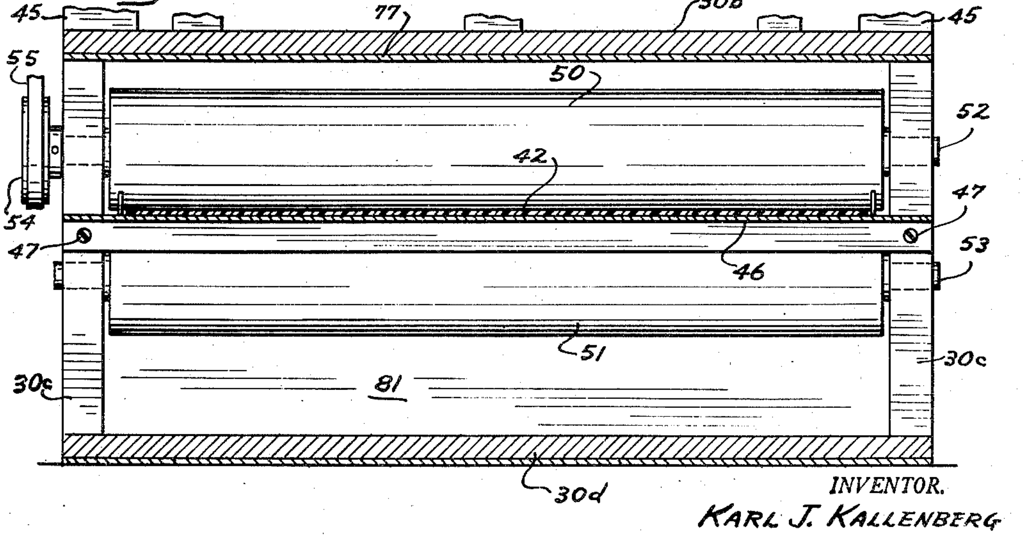
Fig. 19 is a vertical section taken on line 19—19 of Fig. 2, as indicated by the arrows.

In Fig. 20 the wiring diagram including solenoid 210 is shown. The service wires 274 and 275 are shown and a simple double pole switch 276 is shown in the line having movable contacts 276*a* and the fixed contacts 276*b*. Motor 64 is shown as connected in the circuit of conductors 274 and 275. The conductors 180 and 185 are connected in line 275. The contacts 176 and 182 shown in Fig. 11 are also shown, as are their supports 175 and 181. Conductors 274 and 275 are connected respectively through switch 276 and conductors 180 and 185 to the ends of the winding or coil 210*a* of solenoid 210. The core 210*b* of solenoid 210 is shown to which member 208 is connected. It will be seen that when switch 276 is closed, alternating current of 115 volts will be supplied to motor 64. When contacts 176 and 182 are engaged, as later described, solenoid 210 is energized, and when said contacts are separated, solenoid 210 is deenergized.

The description of the operation and the cycle of the apparatus will be started with the exposure period. As stated, during exposure, solenoid 158 is energized. This will hold members 157 in their upper position and spring 166 will be holding the toggle formed by links 141 and 144 in straightened position. The pawls 147 and 148 will be in their upper position and above the position shown in Fig. 15 and their latching surfaces 147*a* and 148*a* will engage the top of portion 144*a* of lever 144. As soon as the exposure has been completed, solenoid 158 is deenergized. Springs 161 and 162 will now instantly pull down yoke 154. Pawls 147 and 148 are moved downwardly with said yoke and portion 144*a* of lever is moved downwardly and the toggle comprising said lever is broken and moved to the position shown in Fig. 14. Drum 82 is constantly driven through belt 83 and belt 69 from motor 64. When the toggle comprising lever 144 is broken, cam member 134 can move away from the axis of shaft 92. This permits swinging of arm 128 and shaft 116 so that the shoes 110 will be moved away from stationary member 87 by spring 126 and will be moved outwardly so that friction members 111 will grip member 82. Shaft 92 is now connected to drum 82 and will be rotated. The cycle of the apparatus takes place in one revolution of drum 82. Member 104 is rotated and carries with it shaft 116 and arm 128 with the rollers 130 and 131. Roller 130 moves past cam member 134 and spring 166 again pulls the toggle comprising member 144 to straighten position. As the pawls 147 and 148 move downwardly after breaking said toggle, they are separated by the cam member 164 and its portion 164*a* so that portion 144*a* is now released. When wheels 102 are rotated by shaft 92, the film 42 is moved along and the exposed portion is moved down along guide member 46, as shown in Fig. 2, and its free end is moved between the rollers 50 and 51. A fresh unexposed portion of the film is now moved into the exposure portion 30*a* beneath the grid 31 and between intensifying screens 35. When the toggle comprising lever 144 was broken and roller 130 moved away from the axis of shaft 92, spring 172 moved member 170 and its portion 170*b* counter-clockwise and the lower end of portion 170*b* moved away from strip 175 so that contacts 176 and 182 became engaged. This closed the circuit of solenoid 210, and as above described this swings bell crank lever 205 and pulls down on link 202 and oscillates shafts 189 and 190 so that arms 188 move the brackets 194 downwardly and move plate 37 and lower screen 35 away from the film. The film was thus released as soon as solenoid 158 was deenergized so that the film could be moved by wheels 102. The energization of solenoid 210 also caused bell crank 205 to pull upon link 212 and swing arm 217 so that shaft 218 was oscillated and through links 221 and 223 the shoes 225 were moved toward each other and friction members 227 engaged disk 230 so that shaft 231 is now held against rotation. As shaft 92 rotates, member 104 is rotated as stated, and member 128 comes around to the position shown in Fig. 11. The toggle comprising lever 144 is now straightened and cam member 134 is held firmly in position. Roller 130 now engages the cam surface 134*a* and this causes member 128 to swing and oscillate shaft 116. This movement swings arm 122 and links 124 to pull the shoes 110 inwardly and the friction members 111 are moved out of engagement with drum 82 and in a very short interval of time the friction members 112 engage stationary member 87 and set the brake formed by members 112 and 87, thus stopping the rotation of shaft 92 and disconnecting member 104 from drum 82. Shaft 92 is thus stopped, together with the wheels 102, as soon as the fresh portion of film has been moved into the exposure portion of the casing. As roller 130 moves along cam surface 134*a*, roller 131 engages the semi-cylindrical portion 170*a* and since cam member 134 is held against movement, said portion 170*a* and member 170, together with portion 170*b*, are swung about the axis of stud 174 and strip 175 is engaged by portion 170*b* and moved to the dotted line portion shown in Fig. 14 so that contacts 176 and 182 are separated. This deenergizes solenoid 210 and springs 195 can now push brackets 194 upwardly thus moving plate 37 and screen 35 upwardly so that screen 35 again engages and clamps the film 42 in position. Arm 217 is moved by spring 260 and this swings member 219 and links 221 and 223 so that shoes 225 are moved away from each other and friction members 227 move away from disk 230. While shaft 92 was being rotated, gear 248 was rotated and said gear rotated gear 247. Shaft 231 was held against rotation as described and the rotation of gear 247 wound up spring 250. When shaft 231 is released, as described, by movement of the shoes 225, spring 250 now rotates shaft 231. Gear 247 is held against rotation by its engagement with gear 248, which latter gear is held against rotation with shaft 92. This rotation of shaft 231 by spring 250 rotates disk 234 and crank arm 236 swings arm 238 upwardly so that the exposed portion of the film is now severed by knife 244. The tension of spring 250 and rotation of shaft 231 is sufficient to move the knife 244 to shearing position and then return the knife and arm 238 to their inoperative position. The exposed portion of film is now cut off from the unexposed portion and the rollers 50 and 51 move the unexposed portion into the container 67. The rotation of rollers 50 and 51 is regulated so as to move the film somewhat slower than do the wheels 102. There is thus no strain on the unexposed portion of the film as it is being moved by wheels 102 and a slight surplus of film accumulates between the shearing member and the rollers 50 and 51. As stated, member 128 has been swung to set the brake and prevent rotation of shaft 92. The apparatus will remain in the position or condition with the brake applied, the film clamped in position, and the parts in the position described until the X-ray apparatus operates to make an exposure and until said exposure is terminated. The X-ray apparatus is usually actuated by pressing the button of a switch. This can be done quite quickly, and as stated, the apparatus has a capacity of permitting five exposures in one second.

There will be a short interval of time between the disengagement of friction members 112 from stationary member 87 and the engagement of friction members 111 to drum 82. This gives time for the operations which take place at the time, such as the movement of the clamping members 194 from clamping to unclamping position.

From the above description it will be seen that we have provided a very novel and efficient device for rapidly making X-ray exposures and for taking care of the necessary movements of the X-ray film. The apparatus goes through its cycle and all of the operations are automatically performed. As stated, the apparatus does not determine the time of the exposure. The cycle of operation of the apparatus starts when the push-button 268 is released and the potential of the circuit shown in Fig. 18 is much decreased so that solenoid 158 is de-energized. The apparatus then operates and an unexposed portion of the film is moved into position for exposure. The film is clamped in said position, the exposed portion of the film is severed, and the cycle is completed. The apparatus will remain inoperative until the termination of the next exposure.

The apparatus has been amply demonstrated in actual practice, found to be very successful and efficient, and preparations for its commercial marketing are under way.

It will of course be understood that various changes may be made in the form, details, arrangement and proportions of the parts, without departing from the scope of applicants' invention, which generally stated, consists in a device capable of carrying out the objects above set forth, in the parts and combinations of parts disclosed and defined in the appended claims.

What is claimed is:

1. An X-ray film-handling device having in combination, an electrical circuit closed when an X-ray exposure is made and opened when said exposure is ended, a casing, means for supporting a supply of continuous film, a plate beneath which said film is disposed for exposure, a motor, a rotatable member continuously driven by said motor, a shaft, means secured to said shaft for engaging and moving said film, means actuated by opening of said circuit for connecting said driven member to said shaft for actuating said second-mentioned means, moving said film and bringing a new portion of said film under said plate for the next exposure, and means for disconnecting said shaft from said member and rendering said last-mentioned means inoperative when said new portion has been moved under said plate.

2. The structure set forth in claim 1, a brake for holding said shaft stationary when so disconnected and during exposure, and means for applying said brake immediately after said last mentioned means operates.

3. An X-ray film-handling device having in combination, a casing, a member supporting a supply of continuous film, said casing having an exposure portion into which said film is movable, a shaft, a stationary member about said shaft, a continuously driven drum about said shaft, a second member secured to said shaft having movable means adapted to frictionally engage said drum to connect the same to said shaft and having means adapted to frictionally engage said stationary member and form a brake to hold said shaft stationary, means secured to said shaft adapted to engage and move said film, and means for moving said movable means of said second member to drive said shaft and cause said last mentioned means to move said film and for moving said second mentioned means of said second member to hold said shaft stationary after said film has been moved.

4. The structure set forth in claim 3, and means for clamping said film in position while said shaft is held stationary and for releasing said film when said shaft is connected to said drum.

5. An X-ray film-handling device having in combination, a casing, a member supporting a supply of continuous film, said casing having an exposure portion into which said film is movable, a shaft, a rotatable drum, means for rotating said drum during one revolution, members secured to said shaft for engaging said film to move an exposed portion from said exposure portion and to move an unexposed portion into said exposure portion, a stationary member, a second member secured to said shaft, friction means carried by said second member movable to engage said drum to connect it to said shaft and disengage said stationary member, or to engage said stationary member to hold said shaft stationary and disengage said drum, a second member carried by said member for moving said friction means, a cam for actuating said second member to cause said friction means to connect said drum and shaft and move said film during a part of said revolution, and means actuating said friction means to hold said shaft stationary during another portion of said revolution while said film is being exposed.

6. The structure set forth in claim 5, clamping means for holding said film, means for operating said clamping means while said shaft is held stationary, and means for rendering said clamping means inoperative while said shaft is being rotated.

7. The structure set forth in claim 5, a knife swingable to position to sever the exposed film portion, a second shaft by which said knife is carried, a torsion spring for rotating said shaft, a gear journaled on said second shaft to which one end of said spring is attached, the other end of said spring being secured to said second shaft, a second gear driven by said first mentioned shaft meshing with said gear, means for holding said second shaft stationary while said first mentioned shaft is rotating whereby said spring will be wound up, and means for releasing said second shaft so that said spring will rotate said second shaft, said knife will be swung to and from said film and said film will be severed.

8. The structure set forth in claim 3, an oscillatable member carried by said second member for moving said means of said second member, a roller carried by said oscillatable member and a cam engaged by said roller for oscillating said oscillatable member and actuating said clutch.

9. The structure set forth in claim 8, an X-ray projector, a toggle mechanism for varying the position of said cam, means for straightening said toggle to hold said cam in one position, and a solenoid energized when said X-ray projector is energized, and means for breaking said toggle when said solenoid is deenergized.

10. An X-ray film-handling device having in combination, a casing, a member supporting a supply of continuous film, said casing having an exposure portion, rotatable members adapted to engage said film for moving a portion thereof into said exposure portion and moving an exposed portion thereof from said exposure portion, a shaft connected to said members, a driven member, a clutch for connecting said shaft to said driven member, a brake for holding said shaft stationary, means for substantially simultaneously setting said brake and releasing said clutch and vice versa, means for holding said film in said exposure portion while said brake is operating, and power operated means for severing the exposed portion of said film.

11. An X-ray film-handling device having in combination, a casing, said casing having an exposure portion, a member supporting a supply of continuous film, means for progressing said film to move an exposed part from said exposure portion and to move an unexposed part into said exposure portion, said means comprising a rotatable actuating member, a driven drum, a stationary member adjacent said drum, a third member connected to said actuating member disposed adjacent said drum, and means for moving said third member at the end of an exposure to connect the same to said drum to move said film and for moving said third member to disconnect the same from said drum and connect the same to said stationary member when an unexposed portion of film has been moved into said exposure portion.

12. The structure set forth in claim 11, said third member having friction means thereon to engage said drum in one position of said third member and having friction means thereon to engage said stationary member in another position of said third member.

13. An X-ray film-handling device having in combination, a casing, said casing having an exposure portion, a member carrying a supply of continuous film, means for progressing said film to move an exposed part from said exposure portion and to move an unexposed part into said exposure portion, said means comprising a rotatable actuating member, a driven cylindrical drum, a cylindrical stationary member within said drum, a third member connected to said actuated member and having a cylindrical portion within said drum, said last mentioned cylindrical portion being disposed between said drum and stationary member, said third member having friction material thereon adapted respectively to engage said drum or said stationary member, and means for moving said third member to engage said friction material with said drum to move said film or to engage said stationary member to hold said actuating member stationary.

14. An X-ray film-handling device having in combination, a casing, said casing having an exposure portion, a member carrying a supply of continuous film, automatically acting means for progressing said film to bring a part thereof into said exposure portion and to move an exposed part away from said exposure portion, means for severing said exposed part of said film comprising a shaft, an arm secured to said shaft, a severing member carried by said arm, a torsion spring on said shaft having one end connected to said shaft, a gear journaled on said shaft to which the other end of said spring is secured, means for rotating said gear, means for holding said shaft stationary during rotation of said gear whereby said spring is wound up on said shaft, and means for releasing said shaft while said gear is held stationary to permit said spring to rotate said shaft and swing said severing member to said film to sever said film.

15. The structure set forth in claim 14, a shear member with which said severing member cooperates to sever said film, said spring being wound sufficiently to move said severing member from normal position to said shear member and back to normal position.

16. An X-ray film-handling device having in combination, an X-ray projector, a casing, said casing having an exposure portion within range of said projector, an electrical means for operating said projector, a member supporting a supply of continuous film, clamping means for holding said film stationary during exposure, means in said casing movable through a cycle to move said clamping means to inoperative position, move said film to move an exposed part away from said exposure portion and move an unexposed part into said exposure portion, sever said exposed portion and move said clamping means to clamping position, and means actuated by a change in potential in said electrical means upon termination of said exposure for actuating said last mentioned means.

17. An X-ray film-handling apparatus having in combination, a casing having an exposure portion, a member supporting a supply of continuous film, means for moving said film to move an unexposed part into said exposure portion and move an exposed part from said exposure portion, a rotatable actuating member for said means, a driven drum, a second member connected to said actuating member having a portion disposed adjacent said drum, a stationary member disposed adjacent said drum, said portion of said second member having means thereon for engaging said drum to connect it to said drum, and having means thereon for engagement with said stationary member to stop rotation of said actuating member, a third member movable to move said second member, a moveable cam for moving said third member, a toggle mechanism adapted to be straightened to hold said cam in position to move said third member to connect it to said stationary member, means for moving and holding said toggle mechanism to straigthened position, spring means arranged to break said toggle, a solenoid adapted to be energized for placing said spring means under tension, an X-ray projector disposed to act on said film, electrical means comprising an electrical circuit including said projector and said solenoid, a switch for closing said circuit, said spring means acting to break said toggle when said solenoid is deenergized by opening of said switch, whereby said cam may move away from said position, and means for then moving said third member to connect it to said drum.

18. An X-ray film-handling apparatus having in combination, a casing having an exposure portion, a member supporting a supply of continuous film, means for moving said film to move an unexposed part into said exposure portion and move an exposed part from said exposure portion, a driven member, a stationary member, a second member having means for engaging said driven member to be driven thereby, and having a second means for engaging said stationary member to hold said second member stationary, said first mentioned means being driven by said second member, an electrically controlled X-ray means for acting on said film during an exposure, and means actuated when said exposure terminates for moving said second member to connect it to said driven member.

19. The structure set forth in claim 18, means for clamping said film to hold the same stationary while said second member is connected to said stationary member, and means actuated when said second means on said second member moves out of engagement with said stationary member to release said clamping means so that said film can be moved.

20. An X-ray film-handling apparatus having in combination, a casing having an exposure portion, a member supporting a supply of continuous film, means for moving said film to move an unexposed part into said exposure portion and move an exposed part from said exposure portion, a member for driving said means, a driven member, a clutch for connecting said member to said driven member, a brake for holding said first mentioned member stationary, means for operating said brake for releasing said first mentioned member and operating said clutch to connect said first mentioned member and driven member, or for operating said clutch to disconnect said first mentioned member and driven member and operating said brake to hold said first mentioned member stationary, whereby said first mentioned means is controlled by said last mentioned means.

21. The structure set forth in claim 20, an X-ray apparatus acting on said film during an exposure, said last mentioned means including a solenoid energized during said exposure and deenergized when said exposure terminates, clamping means for holding said film stationary during an exposure, a second solenoid, means actuated by said solenoid when energized for rendering said clamping means inoperative, and means for energizing said second solenoid when said last mentioned means operates said brake to release said first mentioned member.

22. An X-ray film-handling device having in combination, an X-ray projector, a casing, a member supporting a supply of continuous film, an electrical circuit closed when an exposure of said film is started, and opened when said exposure is ended a plate carried by said casing beneath which said film is disposed for exposure, means for engaging and moving portions of said film to and from exposure position, a power driven continuously rotatable member, and means operated by the opening of said circuit for connecting said power driven member to said first mentioned means and moving said film.

23. An X-ray film-handling device in which a film is exposed to X-rays having in combination, a casing, a member supporting a supply of continuous film, a member mounted in said casing beneath which said film is disposed for the exposure period, an electrical circuit closed when an exposure is started and opened when said exposure is ended, means for engaging and moving said film to and from exposure position, and means actuated by the opening of said circuit for actuating said first mentioned means.

24. An X-ray film-handling device having in combination, an X-ray projector operated during an exposure period of a film, means for terminating the operation of said projector and exposure period, an electrical circuit closed when an exposure is started and opened when said exposure is ended, a solenoid in said circuit and means for moving a portion of said film beneath said member for exposure actuated by said solenoid when said circuit is opened.

25. An X-ray film-handling device in which a film is exposed to X-rays having in combination, a casing, a member supporting a supply of continuous film, a member beneath which said film is disposed during an exposure period, an electrical circuit closed when an exposure is started and opened when said exposure is ended means for moving portions of said film to a position beneath said member and from a position beneath said member, means operated by the opening of said circuit for actuating said first mentioned means, means rendering said first mentioned means inoperative when said film has been moved to exposure position and an exposure begun and said circuit closed, and means for clamping said film against movement.

26. An X-ray film-handling device in which a film is exposed to X-rays having in combination, a casing, a member supporting a supply of continuous film, an electrical circuit closed when an exposure is started and opened when said exposure is ended a member mounted in said casing beneath which said film is disposed during an exposure period, means for moving a portion of said film beneath said member for exposure, means for holding said film in stationary position during said exposure period, and means actuated upon opening of said circuit for releasing said holding means so that said film can again be moved.

27. An X-ray film-handling apparatus having in combination, a casing having an exposure portion, a member supporting a supply of continuous film, means for moving said film to move an unexposed part thereof into said exposure portion and move an exposed part thereof from said exposure portion, means for severing said exposed part, a closed container insertable in and removable from said casing, means for moving said severed exposed part into said casing, a support for said container and a light shield adjacent said support movable to position to prevent light striking the portion of said film still in the apparatus when said container is inserted or removed.

28. An X-ray film-handling device used with means for exposing a film to X-rays having in combination, a casing, said casing having an exposure portion, a member supporting a supply of continuous film, an electrical circuit closed when an X-ray exposure is made and opened when said exposure is ended, means actuated by the opening of said circuit for progressing said film to bring a part thereof into said exposure portion and move the exposed part away from said portion, means actuated by closing of said circuit for clamping said film in stationary position during said exposure and for releasing said film for movement when said circuit is opened.

References Cited in the file of this patent

UNITED STATES PATENTS

| | | |
|---|---|---|
| 1,115,828 | Johnston | Nov. 3, 1914 |
| 1,143,722 | Palmer | June 22, 1915 |
| 1,179,885 | Wiseman | Apr. 18, 1916 |
| 1,699,507 | Spiess | Jan. 15, 1929 |
| 2,095,849 | Wittel | Oct. 12, 1937 |
| 2,250,677 | Paulsen | July 29, 1941 |
| 2,359,582 | Powers | Oct. 3, 1944 |
| 2,375,555 | Howard | May 8, 1945 |
| 2,391,191 | Powers | Dec. 18, 1945 |
| 2,468,381 | Sussin | Apr. 26, 1949 |
| 2,617,944 | Sanchez-Perez | Nov. 11, 1952 |
| 2,619,175 | Gottlieb | Nov. 25, 1952 |

FOREIGN PATENTS

| | | |
|---|---|---|
| 131,163 | Great Britain | Aug. 21, 1919 |